United States Patent [19]

Haupt

[11] Patent Number: 5,338,010
[45] Date of Patent: Aug. 16, 1994

[54] HYDROPNEUMATIC VEHICLE SUSPENSION

[75] Inventor: Josef Haupt, Tettnang, Fed. Rep. of Germany

[73] Assignee: Zahnradfabrik Friedrichshafen AG, Fed. Rep. of Germany

[21] Appl. No.: 960,444

[22] PCT Filed: Jun. 24, 1991

[86] PCT No.: PCT/EP91/01175
§ 371 Date: Dec. 22, 1992
§ 102(e) Date: Dec. 22, 1992

[87] PCT Pub. No.: WO92/00203
PCT Pub. Date: Jan. 9, 1992

[51] Int. Cl.⁵ .................. B60G 17/00; F16F 5/00
[52] U.S. Cl. ............... 267/64.16; 267/64.28; 280/6.12; 280/714
[58] Field of Search ............... 267/64.15, 64.16, 64.28, 267/64.25, 186; 280/DIG. 1, 708, 714, 709, 6.12

[56] References Cited

U.S. PATENT DOCUMENTS

| | | | |
|---|---|---|---|
| 3,550,993 | 12/1970 | Peiffer | 280/708 X |
| 3,736,000 | 5/1973 | Capgvas | 267/64.16 X |
| 3,741,582 | 6/1973 | Eckert | 267/64.28 X |
| 3,913,938 | 10/1975 | Aikawa et al. | 280/708 |
| 3,970,327 | 7/1976 | Dezelan | 280/6.12 X |

FOREIGN PATENT DOCUMENTS

| | | | |
|---|---|---|---|
| 605466 | 9/1960 | Canada | 280/DIG. 1 |
| 1183383 | 12/1964 | Fed. Rep. of Germany | |
| 1780394 | 1/1972 | Fed. Rep. of Germany | |
| 2807299 | 8/1979 | Fed. Rep. of Germany | |
| 2064541 | 7/1971 | France | |
| 2152351 | 4/1973 | France | |
| 1243964 | 7/1986 | U.S.S.R. | 280/708 |
| 1170566 | 11/1969 | United Kingdom | |

OTHER PUBLICATIONS

Research Disclosure, No. 290, Jun. 1988, New York Dan R. Kimberlin: 'Active ride economy valve' p. 358.

Primary Examiner—Robert J. Oberleitner
Assistant Examiner—Kevin D. Rutherford
Attorney, Agent, or Firm—Davis, Bujold & Streck

[57] ABSTRACT

The invention concerns a hydropneumatic vehicle suspension, especially for vehicles in which high axle-load differences occur. To adapt the hydropneumatic suspension to high axle-load differences, the hydropneumatic actuators (7, 8) are designed as double-acting hydraulic cylinders of which the head spaces (5, 6) are connected with a first reservoir (12) and the cylinder spaces (22, 23), on the piston-rod side, are connected with a reservoir (24). The pressure in the second reservoir (24) is controlled by a control valve (18) as a function of the pressure in the first reservoir (12). The solution according to the invention is specially suited for use in agricultural vehicles.

5 Claims, 1 Drawing Sheet

HYDROPNEUMATIC VEHICLE SUSPENSION

The invention in general concerns a hydropneumatic vehicle suspension. Said suspension has hydropneumatic actuators mounted between suspended and unsuspended components. A level control valve is actuated as a function of the relative position with respect to each other of the suspended and unsuspended components, and it connects the hydropneumatic actuators in a first shift position with a pressure line in a second shift position with a drain line. In another shift position said connections are locked.

A hydropneumatic suspension of the above explained type of construction is generally known by the expression level control. The pressure medium such as oil is forced into a reservoir as the axle load increases. The assembly (unsuspended components) descends. A level control valve is adjusted in a manner such that oil, for instance, from a central reservoir, is fed to the actuators until the original level is again reached. When the axle load decreases, oil flows from the reservoir. In this shift position, the level control valve connects the hydropneumatic actuators with a drain line until the original level is again produced. A hydropneumatic suspension that works according to this principle must be regarded as known already, for instance, from DE 17 80 394 A1.

To adapt a hydropneumatic vehicle suspension to different load conditions, a varied of suggestions have already been made aimed at the change of the spring temper of the hydropneumatic actuators. DE 17 55 079 B2 has disclosed an arrangement where a spring-loaded 3-way valve automatically connects the cylinder space on the piston-rod side with a drain line or with the reservoir space. Hereby the spring temper in the unloaded vehicle is lower than in the loaded vehicle.

In a wheel suspension for an agricultural multipurpose vehicle (DE 28 07 299 C2), the pressure space of the hydropneumatic actuator is connectable to a reservoir via a locking valve. Parallel with the locking valve extends a pressure line in which is inserted a 3/3-way valve. When the locking valve is closed, leaf springs assume the support of the assembly. In unloaded condition of the vehicle, a very weak spring suspension exists. By opening the locking valve, the mechanical suspension is hydropneumatically supported. The characteristic line of said suspension is then considerably steeper whereby the suspension fails more severely. By adjusting the 3/3-way valve, the pressure of the pressure medium of the hydropneumatic actuator is brought to the value required for the existing load, which value is adjusted by a manometer.

In vehicles used in agriculture, such as tractors, high axle-load differences occur. When working with an attached plow, the rear axle is heavily loaded and the front axle considerably unloaded. Reverse circumstances exist when working with a front loader. The steps known already for adapting a hydropneumatic suspension do not allow taking into consideration such different conditions of use at all.

The problem on which the invention is based consists in designing a hydropneumatic suspension in which the static pressure ratio resulting from the highest and lowest axle loads, the maximum admissible dynamic pressure, the maximum admissible pressure ratio of the reservoir and the remains of a residual amount of oil in the reservoir in the presence of a minimal axle load be sufficiently taken into consideration or ensured. The natural frequency of the assembly should be 1 hertz in a vehicle used in agriculture and building.

The problem on which the invention is based is solved by the fact that the hydropneumatic actuators are double-acting hydraulic cylinders whose head spaces are connected with a first reservoir and whose cylinder spaces, on the piston-rod side, are connected with a second reservoir. A control valve connects the second reservoir with the pressure line or separates it therefrom depending on the pressure in the first reservoir. An essential feature of the solution according to the invention consists in dividing the hydropneumatic suspension in two pressure sides. The high-pressure side of said system consists of the head spaces of the hydropneumatic actuators and a first reservoir. Said arrangement is complemented by a level control. The low-pressure side consists of the cylinder spaces on the piston-rod side of the hydropneumatic actuators and a second reservoir. The control valve effects the building up of a back pressure on the low-pressure side with decreasing axle load, that is, decreasing pressure on the high-pressure side. The solution according to the invention altogether allows an adaptation of the hydropneumatic suspension to high axle load differences. In the solution of the invention, the static pressure ratio resulting from the highest and lowest axle loads under no circumstances leads to a complete drainage of the first reservoir, since a back pressure is built up as the axle load decreases. Accordingly, a reliable function of the level control is ensured even with said high axle-load differences, since a residual portion of oil remains in the first reservoir in all load conditions of the vehicle. By virtue of the controllable back pressure in the second reservoir, a parallel shifting of the spring action of the first and second reservoirs occurs. A great spring rigidity is obtained in the range of lower axle loads. Thus the natural frequency of the assembly can be held substantially constant (approx. 1 hertz) by the axle loads.

In a preferred embodiment of the invention, the control valve is designed as a piston manometer. By said piston manometer a given pressure ratio between the pressures of the first and second reservoirs can always be automatically controlled in accordance with the axle loads that appear. Even with high axle-load differences, it is possible to use a reservoir which has a conventional volume and works at a conventional pressure ratio.

It is advantageous to design the control valve as a directional valve having connections leading to the pressure and drain line and to the cylinder spaces. Said control valve is shifted as a function of the pressures in the first and second reservoirs. Adequate control lines are provided for this purpose.

Other features essential to the invention and the advantages resulting therefrom can be deduced from the description that follows of two embodiments.

Figure 1:
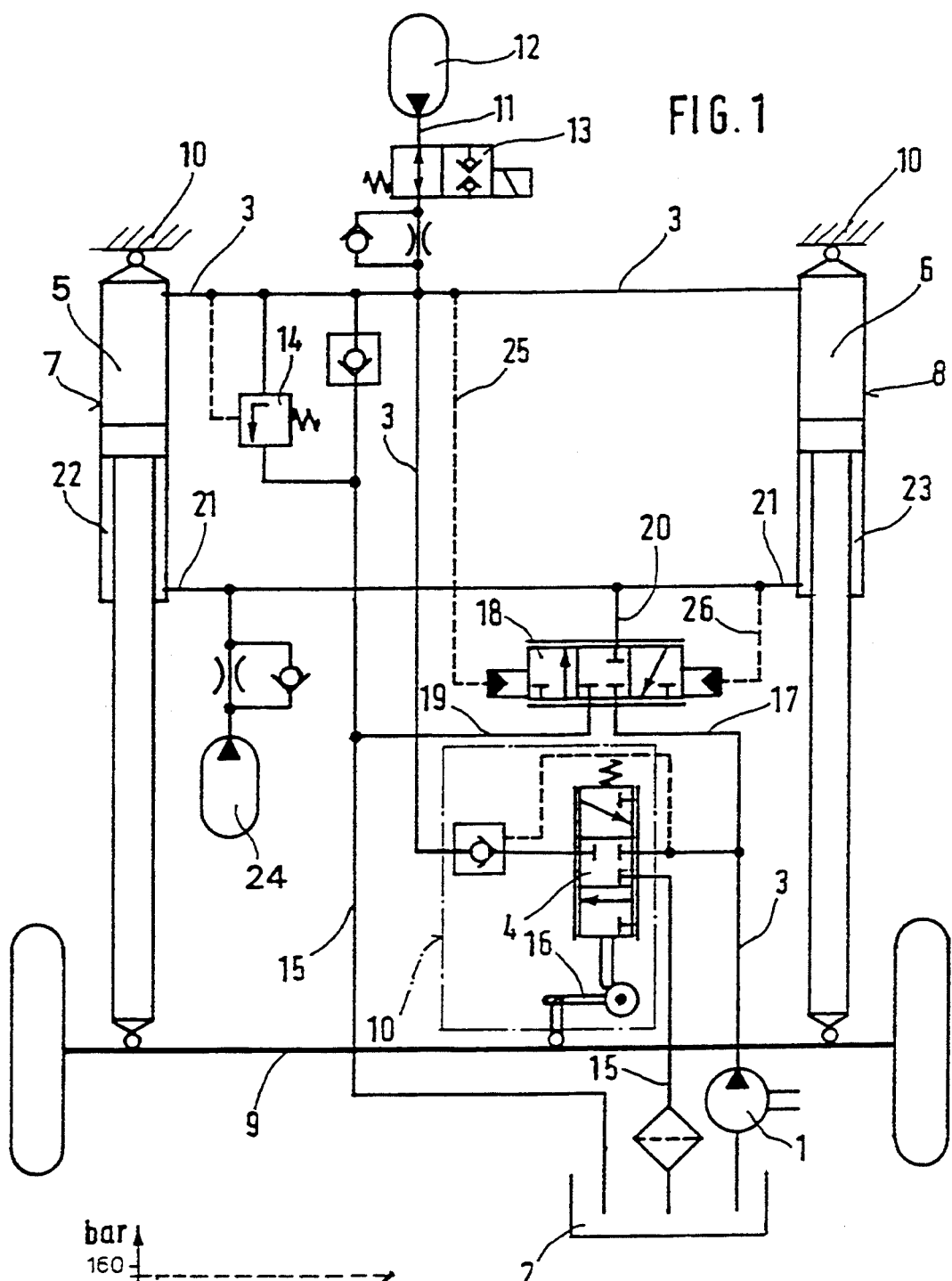
FIG. 1 is the circuit diagram of a hydropneumatic vehicle suspension, especially for an agricultural vehicle.

The circuit diagram of FIG. 1 reproduces, in a very simplified diagrammatic form, the construction of a hydropneumatic suspension. A pump 1 advances pressure medium such as oil from a tank 2 into a pressure line 3. The pressure line 3 leads to a level control valve 4 and from there to head spaces 5 and 6 of hydropneumatic actuators 7 and 8. The hydropneumatic actuators are mounted between suspended and unsuspended components. The suspended component, in this case, is the axle 9 of a tractor which can be designed for steering or not. The unsuspended component especially consists of the weight of the assembly 10. The assembly 10 is indicated only by shaded surfaces. A connecting line 11 leads from the pressure line 3 to a first reservoir 12. From the circuit diagram it clearly results that the hydropneumatic actuators 7 and 8 are double-acting hydraulic cylinders, the head spaces 5 and 6 of which are connected with the first reservoir 12. The first reservoir 12 can be separated from the pressure line 3 by a locking valve 13.

The pressure line 3 can be connected with a drain line 15 by a pressure-limiting valve.

Level control

When the axle load increases, oil is forced out of the head spaces 5 and 6 of the hydropneumatic actuators 7 and 8 into the first reservoir 12. The assembly 10 accordingly descends. A position adjuster 16 adjusts the level control valve so that the pump 1, via the pressure line 3, feeds oil to the head spaces 5 and 6 until the original level has again been reached.

When the axle load decreases, the oil is forced out of the first reservoir 12 into the head spaces 5 and 6. As consequence of this, the assembly 10 rises. The position adjuster 16 adjusts the level-control valve 4 in the above plotted shift position so that the head spaces 5 and 6 become connected with the drain line 15 via the pressure line 3. The level control valve 4 allows oil to flow from the head spaces 5 and 6 or from the first reservoir 12 into the tank 2 until the original level is again reached.

Another connecting line 17 leads from the pressure line 3 to a control valve 18 which, in this case, is designed as 3/3-way valve. In the neutral position shown, the control valve 18 is connected to the drain line 15 via a connecting line 19. Another connection 20 leads to a line 21. The line 21 interconnects the cylinder spaces 22 and 23 on the piston-rod side of the hydropneumatic actuators 7 and 8. A second reservoir 24 is connected to the line 21.

A control line connects the control valve 18, on one side, with the pressure line 3 so that it is shifted depending on the pressure in the first reservoir. Another control line 26 connects the control valve 18 with the line 21 so that it is shifted depending on the pressure in the second reservoir.

The main function of the control valve 18 consists in connecting the second reservoir 27 with the pressure line 3 according to the pressure in the first reservoir 12, that is, building up a back pressure, or separating it from the pressure line, that is, removing the back pressure.

The control valve 18, designed as 3/3-way valve, works as a piston manometer with which, over the control line 25, a given pressure ratio between the pressures of the first and second reservoirs 12 and 24, as a function of the load of the hydropneumatic actuators 7 and 8, can automatically be constantly controlled. Depending on the practical requirements, another course, such as according to a step function, can be adjusted instead of a constant function (pressure in the second reservoir as function of the pressure in the first reservoir or the prevailing axle load).

Figure 2:
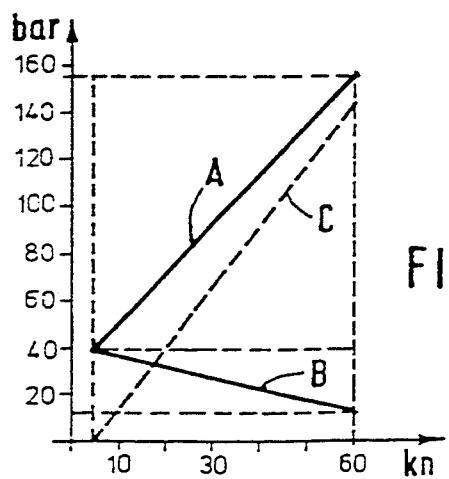
FIG. 2 is a greatly simplified diagram for designing the hydropneumatic suspension according to FIG. 1.

The fundamental course of the pressures in the first and second reservoirs results from the diagram of FIG. 2. The diagram shows the pressure values in bar over the axle load in kilonewton. The straight line designated with A reproduces the pressure course in the first reservoir. When the axle load is lowest, the lowest pressure in the first reservoir amounts to approx. 10 bar. In case of an axle load of approx. 60 kilonewton, the pressure in the first reservoir reaches a maximum of about 155 bar.

The highest pressure in the second reservoir amounts to approx. 40 bar. Here the axle load is at its lowest. The pressure in the second reservoir descends to about 15 bar with an axle load of approx. 60 kilonewton. The straight line extending through said points is designated with B. The dotted line corresponds to the resultant, that is, the pressure in the first reservoir taking into account the pressure portion in the second reservoir. Said line is designated with C. By virtue of the parallel connection of the spring actions of the first and of the second reservoir, there a characteristic line originates which in the range of lower axle loads extends more steeply compared with the inclination of the straight line A in this range. The hydropneumatic suspension is here designed sturdier. An essential advantage of the hydropneumatic suspension designed according to the invention further consists in that the natural frequency of the system in the area of the axle loads of from about 10 to about 60 kilonewton, in the instant case, extends comparatively constant. First of all in the range of lower axle loads the natural frequency is raised closer to the 1 hertz value. In a design of the hydropneumatic suspension, such as substantially corresponds to the ratios reproduced in FIG. 2, the natural frequency with an axle load of approx. 10 kilonewton amounts to about 0.8 hertz and rises to a value of about 1.7 hertz which corresponds to an axle load of approx. 60 kilonewton.

REFERENCE NUMERALS

| | |
|---|---|
| 1 | pump |
| 2 | tank |
| 3 | pressure line |
| 4 | level-control valve |
| 5 | head space |
| 6 | head space |
| 7 | hydropneumatic actuator |
| 8 | hydropneumatic actuator |
| 9 | axle |
| 10 | assembly |
| 11 | connecting line |
| 12 | first reservoir |
| 13 | locking valve |
| 14 | pressure-limiting valve |
| 15 | drain line |
| 16 | position adjuster |
| 17 | connecting line |
| 18 | control valve |
| 19 | connecting line |
| 20 | connection |
| 21 | line |
| 22 | cylinder space on piston-rod side |
| 23 | cylinder space on piston-rod side |
| 24 | second reservoir |
| 25 | control line |
| 26 | control line |

I claim:

1. A hydropneumatic vehicle suspension comprising actuators (7, 8) being mounted between suspended and unsuspended components (9, 10), a level control valve (4) which, depending on the level control valve position relative to said suspended and unsuspended components (9, 10), connecting said actuators (7, 8), in a first shift position, with a pressure line (3) and connecting said actuators (7, 8), in a second shift position, with a drain line (15) and, in a third shift position, blocking said connections, at least two of said actuators (7, 8) being double-acting hydraulic cylinders having a head space (5, 6) being connected with a first reservoir (12) and a cylinder space (22, 23), on a piston-rod side of said hydraulic cylinders, being in constant and direct communication with a second reservoir (24), and a second control valve (18), depending on the pressure in said first reservoir (12), one of connecting said second reservoir (24) with said pressure line (3) and separating said second reservoir (24) from said pressure line (3), wherein said second control valve (18) functions as a piston manometer in which a given pressure ratio (C) between the pressures of said first and said second reservoirs (12, 24) is constantly controlled, depending on the load of said actuators (7, 8), and said second control valve (18) is a directional valve which has connections (17, 19, 20) leading to said pressure and drain lines (3, 15) and said cylinder spaces (22, 23) and an operating position of said second control valve 18 is controlled by control lines (25, 26) pressurizable by fluid pressure in said first and second reservoirs (12, 24).

2. A hydropneumatic vehicle suspension according to claim 1, wherein when a desired pressure is reached in said second reservoir (24), said second control valve (18) connects said second reservoir (24) with said drain line (15).

3. A hydropneumatic vehicle suspension according to claim 1, wherein, within defined limits of a given pressure ratio of said first and second reservoirs (12, 24), said second control valve (18) remains in a neutral position in which said second reservoir (24) is separated from both said pressure line and said drain line.

4. A hydropneumatic vehicle suspension according to claim 1, wherein said first reservoir (12) is positioned in a first pressure circuit and said second reservoir (24) which is positioned in a separate second pressure circuit, and the working pressure of said first pressure circuit is greater than a working pressure of said second pressure circuit.

5. A hydropneumatic vehicle suspension comprising actuators (7, 8) being mounted between suspended and unsuspended components (9, 10), a level control valve (4) which, depending on the level control valve position relative to said suspended and unsuspended components (9, 10), connecting said actuators (7, 8), in a first shift position, with a pressure line (3) and connecting said actuators (7, 8), in a second shift position, with a drain line (15) and, in a third shift position, blocking said connections, said actuators (7, 8) being double-acting hydraulic cylinders having head spaces (5, 6) connected with a first reservoir (12) and cylinder spaces (22, 23), on a piston-rod side of said hydraulic cylinders, connected with a second reservoir (24), and a second control valve (18), depending on the pressure in said first reservoir (12), one of connecting said second reservoir (24) with said pressure line (3) and separating said second reservoir (24) from said pressure line (3);

wherein said second control valve (18) functions as a piston manometer in which a given pressure ratio (C) between the pressures of said first and said second reservoirs (12, 24) is constantly controlled, depending on the load of said actuators (7, 8), and said second control valve (18) is a directional valve which has connections (17, 19, 20) leading to said pressure and drain lines (3, 15) and said cylinder spaces (22, 23) and has control lines (25, 26) pressurizable by fluid pressure in said first and second reservoirs (12, 24), and a locking valve (13) controls the fluid pressure of said first reservoir.

* * * * *